United States Patent [19]
Christensen et al.

[11] Patent Number: 5,839,207
[45] Date of Patent: Nov. 24, 1998

[54] FLUID BED APPARATUS, A BED PLATE THEREFORE, AND A METHOD OF MAKING A BED PLATE

[75] Inventors: Mogens A Christensen, Virum; Benny H. Madsen, Horsens, both of Denmark

[73] Assignee: Niro A/S, Soborg, Denmark

[21] Appl. No.: 771,771

[22] Filed: Dec. 20, 1996

Related U.S. Application Data

[60] Provisional application No. 60/009,586 Jan. 4, 1996.

[30] Foreign Application Priority Data

Dec. 22, 1995 [DK] Denmark ................. 1471/95

[51] Int. Cl.$^6$ ...................................... F26B 3/08
[52] U.S. Cl. ......................... 34/369; 34/583; 34/588
[58] Field of Search .................. 34/360, 369, 582, 34/583, 588; 366/101; 52/302.3

[56] References Cited

U.S. PATENT DOCUMENTS

| | | | |
|---|---|---|---|
| 4,033,555 | 7/1977 | Fong | 366/101 |
| 4,305,210 | 12/1981 | Christensen et al. | 34/583 |
| 4,399,196 | 8/1983 | Schey | 428/582 |
| 4,562,678 | 1/1986 | Carroll et al. | 52/302.3 |
| 4,885,848 | 12/1989 | Christensen | 34/582 |
| 5,357,688 | 10/1994 | Christensen | 34/369 |
| 5,392,531 | 2/1995 | Christensen et al. | 34/583 |
| 5,593,715 | 1/1997 | Christensen | 34/369 X |

FOREIGN PATENT DOCUMENTS

| | | |
|---|---|---|
| 299279 | 1/1989 | European Pat. Off. . |
| 430849 | 6/1991 | European Pat. Off. . |
| 474949 | 3/1992 | European Pat. Off. . |
| 507038 | 10/1992 | European Pat. Off. . |
| 601255 | 6/1994 | European Pat. Off. . |
| 911866 | 7/1946 | France . |
| 1398143 | 12/1965 | France . |
| 2226207 | 11/1994 | France . |
| 4408807 | 3/1994 | Germany . |
| 57-140836 | 2/1982 | Japan . |
| 2205217 | 8/1990 | Japan . |

*Primary Examiner*—Henry A. Bennett
*Assistant Examiner*—Steve Gravini
*Attorney, Agent, or Firm*—Dennison, Meserole, Pollack & Scheiner

[57] ABSTRACT

A bed plate for a fluid bed apparatus comprises a great plurality of bulges or dents each having at least one through-going gas flow opening defined therein. Conventional bed plates having openings of the gill type inevitably comprises small cracks or notches formed in the edge portion defining each of the gas flow openings. According to the invention the gas flow openings are formed in the bulges or dents in a manner so as to exclude the formation of such notches in the edge portion. This may, for example, be done by forming such openings with crack free edges prior to or after the formation of the bulges or dents. Thus, the openings may be formed by punching, drilling, laser cutting or the like. Each of the gas flow openings is directed in relation to the plane of the bed plate so as to cause a flow of gas, which is passed through the opening, to contact an adjacent part of the bed plate, which interconnects the bulges or dents.

39 Claims, 4 Drawing Sheets

FIG. 5
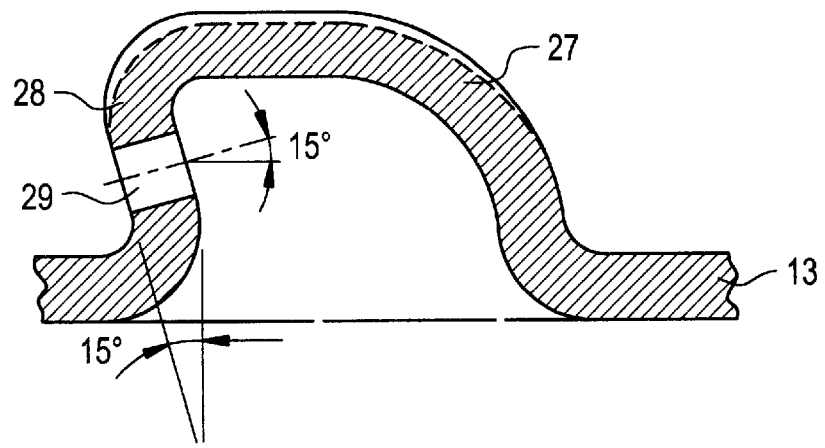
FIG. 6A        FIG. 7A        FIG. 8A
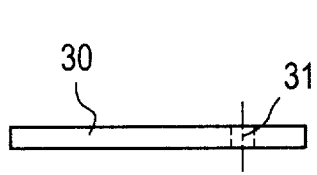 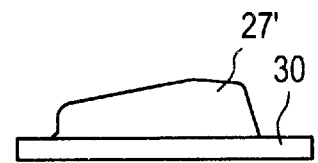 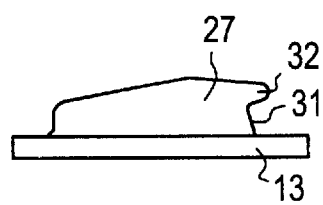
FIG. 6B        FIG. 7B        FIG. 8B
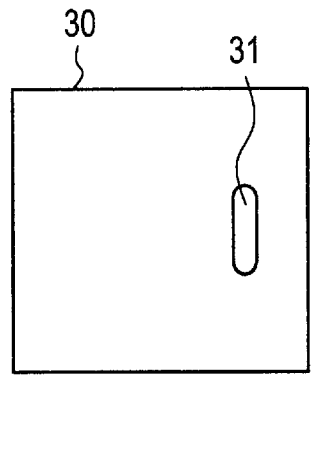 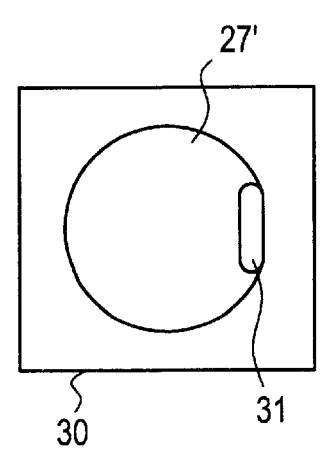 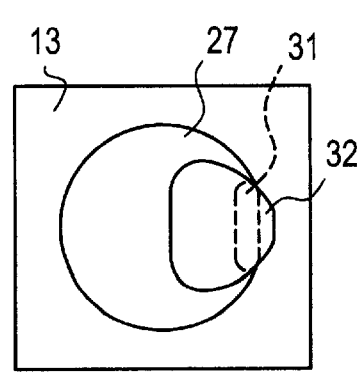

FLUID BED APPARATUS, A BED PLATE THEREFORE, AND A METHOD OF MAKING A BED PLATE

This application is based on Provisional Application No. 60/009,586, filed Jan. 4, 1996.

BACKGROUND OF THE INVENTION

The present invention relates to a bed plate for a fluid bed apparatus and for distributing for example drying and/or cooling fluidizing gas for treating a pulverulent or particulate material or product.

The use of fluid beds for drying, agglomerating and/or cooling particular or powdered products is well known. An essential part of a fluid bed apparatus is the bed plate or gas distributor plate which is designed so as to create a desired gas flow pattern, locally as well as totally, within the fluidized product layer, and so as to create a desired resulting product flow from an inlet portion to an outlet portion of the plate. The bed plate should also be designed to overcome some disadvantages attached to the use of perforated plates in connection with a particulate and possibly also heat-sensitive product.

DE-A-4408807 discloses a fluid bed plate of a type in which each gas flow opening is provided with a gas distributing nozzle each composed by a number of separate parts. Bed plates of this type are complicated and expensive to produce, and they can not be effectively cleaned after use unless the various parts of the plate are disassembled, cleaned and reassembled. Therefore, bed plates of this type are not suited for processing food products, pharmaceuticals and similar products.

The present invention relates to a fluid bed plate of the type made in a single piece. Such a one-piece plate is known from EP-B-474949 disclosing a so-called gill-plate creating a controlled resulting product flow from an inlet towards an outlet of the fluid bed. EP-A-601255 and EP-B-430849 disclose such gill-plate with advantageous gill patterns. EP-B-299279 discloses a special type of gill-plate, and EP-B-507036 discloses a non-sifting gill-plate preventing material to fall though the fluid bed plate when the supply of fluidizing gas is being shut off. By these prior art developments in the foregoing years bed plates having at least some of the following advantageous characteristics or features have been created: Mechanical stability, directional fluidizing gas flows, controlled product transport along the bed plate, self-emptying characteristics, ability of treating heat-sensitive products, non-sifting characteristics, and easy cleaning.

FR-A-2,226,207 discloses a bed plate having a plurality of hemispherically shaped bulges. Each of the bulges has circular gas flow openings formed therein, and the axis of each gas flow opening forms an angle of 45° with the plane of the bed plate.

Finally, JP-U-A-57140836 discloses a bed plate having a plurality of mutually spaced, transversely extending corrugations having side walls extending substantially at right angles to the plane of the bed plate. A number of circular gas flow openings are formed in the opposite side walls of each corrugation, and slide members for adjusting the effective area of the openings are provided. None of the two last mentioned known bed plates is self clearing or self-cleaning like the so-called gill-plates.

SUMMARY OF THE INVENTION

The present invention provides a bed plate for a fluid bed apparatus, by which bed plate the advantages of the conventional gill type bed plates may be obtained, while in addition the bed plate according to the invention comply with sanitary objectives to a higher degree than the conventional bed plates.

Thus, the present invention provides a bed plate of the above type comprising a plurality of bulges or dents each having at least one through-going gas flow opening defined therein by a surrounding edge portion in a manner so as to exclude the formation of notches in said edge portion, the maximum dimension of each of the bulges or dents—which are preferably, but not necessarily substantially uniformly distributed on the bed plate—being only a small fraction of the minimum dimension of the area of the bed plate, which may have a maximum and a minimum dimension, each of at least a substantial part of the gas flow openings being directed in relation to the plane of the bed plate so as to cause a flow of gas being passed through the opening to contact an adjacent part of the bed plate interconnecting said bulges or dents. Said minimum dimension refers to the area of the bed plate in which the bulges or dents are formed. When the bed plate has an elongated form, said minimum dimension should be understood as the maximum transverse dimension, and when the bed plate is formed as a circle, a square or a regular polygon, the "minimum dimension" is equal to the maximum dimension. Thus, the "minimum dimension" of a rectangular bed plate is the width of the plate, while the "minimum dimension" of a circular bed plate is the diameter of the plate.

The present invention has been based on the finding that despite the many advantages associated with conventional bed plates with openings of the gill type, the gill type openings suffer from a disadvantage, namely that they contain tiny cracks or notches formed in the edge portion of each gas flow openings or perforation of the bed plate. The formation of such tiny cracks or notches in the edge portions of the gill type openings or perforations is inherently associated with the method in which gill type openings are produced, namely by cutting a slit or a pair of slits in a metal plate and by depressing the plate material adjacent to the slit or slits so as to form a bulge or dent. The depression of the plate material adjacent to the slit or slits causes a certain tearing of the plate material and the ends of each slit, whereby tiny cracks or notches are formed. Such tiny cracks or notches in the prior art bed plates involve a risk of bacterial contamination of the product being treated, and this is especially disadvantageous, when for example, food products or pharmaceuticals are being treated.

In the bed plate according to the invention the edge portions of the gas flow openings have been formed or shaped so that cracks or notches are excluded while the self clearing effect has been maintained. This may be obtained in many different ways as explained below, and the bed plate may be made from any suitable material.

The edge portion defining each gas flow opening may have a polygonal shape. In such case each vertex of the polygon preferably defines an angle of at least 90°. Preferably, however, the gas flow openings do not have such vertices. As an example, the edge portion of each gas flow opening may have a curved shape along its total extent.

At least a substantial part of the gas flow openings formed in the bed plate are directed such that gas flows being passed therethrough are contacting an adjacent part of the bed plate. This means that the gas flows passing through the gas flow openings are so-called "wall jets". When the bed plate according to the invention is used in a fluid bed and the gas flow openings are positioned so as to cause a controlled resulting product flow from an inlet towards an outlet of the fluid bed as well-known in connection with bed plates of the gill type, the flow is directed so as to ensure a movement of the product being closest to the bed plate to avoid overheating or temperature damage.

The axis of said at least one gas flow opening of said substantial part of the gas flow openings may diverge in relation to the plane of the bed plate, and the axis of the gas flow openings may define an angle smaller than 20° with the plane of the bed plate. This angle may be smaller than 15° and preferably smaller than 12.5°. However, according to a presently preferred embodiment the axis of said at least one gas flow opening and the plane of the bed plate are converging, and in such case the axis of said gas flow opening defines with the plane of the bed plate an angle which is less than 45° and preferably about 15°.

Each of at least some of said bulges or dents may comprise a substantially plane wall part in which the gas flow opening is formed. The axis of the gas flow opening may then be substantially perpendicular to such plane wall part, which may therefore define a slightly obtuse angle not exceeding 110°, a right angle, or an acute angle of at least 45°.

In order that the plate may have good sanitary characteristics the radius of curvature of the edge portion defining each gas flow opening should not decrease a certain minimum. Preferably the radius of curvature of the edge portion of each gas flow opening is at least 0.2 and preferably at least 0.5 mm or 1.0 mm at any point at the edge portion. The gas flow opening may have a substantially circular or elliptical shape or the gas flow opening may be defined by any other concavely shaped edge portion or by an edge portion being a combination of concave and convex shapes. Alternatively, the gas flow opening may be defined by straight line segments interconnected by concavely and/or convexly curved line segments, such as a pair of substantially parallel line segments interconnected by a semicircular line segment at each end, or a hand weight like shape.

The bed plate according to the invention may comprise any combination of known bed plate openings and of said plurality of bulges according to the present invention. Furthermore, the opening or openings defined in said plurality of bulges or dents may be directed in any desired manner. Preferably, however, at least the majority of the gas flow openings are positioned and formed in the respective bulges such that gas flowing therethrough has a flow component extending parallel to the plane of the bed plate, whereby the gas flowing through the openings of the bed plate has not only a fluidizing effect, but also a product transporting effect along the bed plate. Sifting of material left on the bed plate through the perforations of the plate when the supply of gas through the gas flow openings is stopped, is reduced or prevented when at least some of said majority of gas flow openings are positioned and/or formed in the respective bulges so as to direct a gas flow therethrough substantially parallel with or towards the plane of the bed plate. This embodiment also promotes product movement on the bed plate and may secure substantially complete emptying of product from the bed plate when the supply of product to the bed plate is stopped as mentioned above. The direction of each gas flow may in the vertical plane define any angle with the direction of product transport from a product inlet to a product outlet of the fluid bed apparatus, and the various transporting gas flows may define different angles with the direction, if desired. It has been found that sifting may be prevented completely when the axis of each gas flow opening defines an angle with the plane of the bed plate being smaller than 20° and preferable about 15°.

The bed plate according to the invention may be made from any suitable material, such as polymers and other plastic materials, composite materials or ceramics. However, preferably the bed plate according to the invention is made from metal or a metal alloy, preferably from stainless steel in coils or sheets.

The bed plate according to the invention may be intended to be arranged in the fluid bed apparatus with the bulges or dents directed upwardly. In such case the inner space defined by each bulge or dent may be surrounded by a collar or rim portion extending from the plate opposite to the bulge or dents. Such collar or rim portion may reduce the adverse influence of the gas flow pattern in a plenum chamber below the bed plate on the gas flow pattern in the inner space of the associated bulge or dent.

The bulges or dents may have any suitable shape and each bed plate may comprise differently shaped bulges or dents. At least some of the bulges or dents may be shaped substantially as spherical segments or hemispheres. Such spherical segment may be produced with one or more openings, for example one or more elongated openings extending peripherally in relation to the bulge or dent.

As mentioned above each bulge or dent may have one or more gas flow openings or perforations formed therein. The number of openings in each bulge and the mutual position of the openings may be chosen so as to obtain a desired resulting product flow along the bed plate. As previously mentioned, the bulges or dents formed on the same bed plate may be of different shapes, and the number of openings in various bulges may be different. The flow components parallel to the plate of the bed plate may be individually oriented in such a way that a desired resulting product flow towards the product outlet of the fluid bed apparatus is obtained. Some of the bulges or dents may have only one perforation each while other bulges or dents of the same bed plate may each have two or more openings or perforations formed therein thereby creating a resulting product flow in the direction of the majority of the openings or perforations. A similar effect may be obtained by having gas openings of identical bulges or dents pointing in opposite directions, the number of bulges having openings pointing in one direction being smaller than the number of openings pointing in the opposite direction. Furthermore, each of the openings pointing in one direction may be larger than each of the openings pointing in the opposite direction.

The bulges or dents on the bed plate may be arranged in a symmetrical or non-symmetrical pattern, and the bulges may be uniformly or non-uniformly distributed on the plate. As an example, the number of bulges per square unit may be greater at one end (for example the inlet end) of the bed plate than at the other end (for example the outlet end) of the plate where the product being treated is more dry and needs a smaller amount of fluidizing gas to become fluidized. For other purposes the mutual spacings of the gas flow openings or perforations may be varied throughout the bed plate. The orientation of the gas flow openings in the bulges or dents may be the same in each of a number of longitudinally or transversely extending zones of the plate. Alternatively, the orientation of the gas flow opening or openings of each bulge or dent may be chosen individually. Furthermore, the openings or perforations may be combined in pairs or in groups so as to obtain a desired flow.

The distribution of the bulges or dents on the bed plate and the type of gas flow openings can be selected throughout the plate considering interaction with integrated gas cleaning filters, returning fines into the fluid bed, and/or interaction with spray nozzles in spray fluidized beds for granulation or coating.

The bed plate may have a polygonal outline, preferably a rectangular outline. Alternatively, the outline of the bed plate may be circular or substantially circular, for example be in the form of a regular hexagon or octagon. In such case the gas flow openings may be oriented so as to provide peripherally directed gas flows.

The present invention further provides a method of making a bed plate for a fluid bed apparatus from a plate blank. The present invention further provides a method of making a bed plate for a fluid bed apparatus from a plate blank, wherein a plurality of bulges or dents each having at least one through-going gas flow opening defined therein by a surrounding edge portion is formed in the plate blank in a manner so as to exclude the formation of notches in said edge portion, the maximum dimension of each of the bulges or dents being only a small fraction of the minimum dimension of the area of the bed plate, each of at least a substantial part of the gas flow openings being directed in relation to the plane of the bed plate so as to cause a flow of gas being passed through the opening to contact an adjacent part of the bed plate interconnecting said bulges or dents.

As explained above, the formation of tiny cracks or notches in the edge portions defining the openings of the gill type is inherently associated with the manner in which a gill type opening is produced. However, there are many different ways in which formation of such cracks or notches may be avoided or excluded. As an example, a curved shape may be applied to the edge portion of each gas flow opening along its total extent. Such curved shape may include linear segments.

The gas flow openings may have a polygonal outline. For sanitary reasons, however, the edge portion of each gas flow opening is preferably formed with a radius of curvature being at least 0.2 mm and preferably at least about 0.5 mm or 1.0 mm at any point of the edge portion.

Such edge portion without cracks or notches may, for example, be made by compressing the material of the edge portion to such an extent that the material is exposed to plastic deformation, so that possible cracks are removed. In a preferred embodiment, however, each through-going gas flow opening is made by cutting plate material out from the plate blank. Thus, the opening cut is not just a slit, but a real opening of any desired shape which may then be exposed to a certain deformation resulting in the final shape desired.

The gas flow openings may be cut in the plate sample in any suitable manner, for example by drilling or milling. Preferably the openings are made by punching or by means of laser.

Dependent on the plate material the bulges or dents and the openings, respectively, can be made by any combination of forming, moulding, drilling, punching, laser-cutting, etc.

Each gas flow opening may be cut in the plate blank part prior to forming said plate blank part into a bulge or dent. This means, that a desired pattern of straight openings may be punches or cut in the flat plate blank with crack free edge portions. Subsequently, a pattern of bulges or dents may be formed in the plate blank so that the openings are positioned in the bulges as desired.

Alternatively, the bulges or dents may be formed on the plate blank in a desired pattern, and thereafter one or more openings may be cut in each bulge in desired positions in any suitable manner, such as by drilling or by laser cutting.

In contrast to the prior art method of making gill type openings, the method according to the present invention allows for selection of a desired size of the gas flow opening independently of the size or inner volume of the respective bulge or dent. Also the position of the gas flow opening or openings in each bulge or dent may be chosen rather freely.

The bulges or dents may be formed in the plate blank by pressing or by another kind of plastic deformation of the plate blank material. The edge portions of the gas flow openings may be shaped by plastic deformation of the plate blank material surrounding each opening. As an example, a collar or flange surrounding each opening and extending transversely to the plane of the plate opposite to the bulges or dents may be formed by plastic deformation. Such plastic deformation may take place at the same time as when the bulges or dents are formed or in a separate step.

Each bulge or dent may be formed in one or more steps, said plate blank part with the gas flow opening or openings cut therein being included into the bulge or dent during a first step or in a later step. For example, a preliminary dent or bulge may be made during a first pressing step and in a second pressing step the plate blank part from which the bulge is made is extended to the plate blank part containing the opening or openings. When the bulge or dent has obtained its final shape, this plate blank part may define an almost right angle or an acute angle of about 75° and at least 45° with the adjacent part of the plate. In another embodiment this angle is somewhat obtuse, preferably less than 135° and the non-sifting characteristic may be secured by one or more forming steps.

The present invention further provides a fluid bed apparatus comprising a fluidizing chamber having a product inlet and a product outlet and a bed plate according to the invention as described above defining the fluidizing chamber downwardly, and a plenum chamber defined below the bed plate for the supply of fluidizing gas.

The bulges or dents are preferably formed at the upper side of the bed plate. The inner space of each bulges or dent then forms part of the plenum chamber and the inner space of each bulge or dent may be formed so as to obtain the desired gas flow direction through the opening or openings of the bulge.

Because each bulge may be shaped so as to have any desired inner volume and possibly be surrounded by an annular collar extending transversely to the bed plate into the plenum chamber as described above, the fluid bed apparatus according to the invention may be made less sensitive to inexpedient vortex gas flow in the plenum chamber than gill type plates. This means, that the gas flowing into the fluidizing chamber through the gas flow openings are predominantly influenced by the static pressure within the plenum chamber rather than by possible vortex flows therein.

The velocity of the fluidizing gas flows may be changed by changing the number of gas flow openings or perforations in the bed plate per square unit and/or by changing the size of each opening. The plate can be designed for a fluidizing flow velocity within the range of 0.1 to 2 m/sec, and possibly lower or higher if needed, depending on the particle size distribution of the material to be fluidized and on the process in question.

The invention further relates to use of the fluid bed apparatuses according to the invention for drying, agglomerating, and/or cooling a particular product. Furthermore, the invention provides a product processed in the fluid bed apparatus according to the invention. Thereby bacterial contamination may be minimized.

BRIEF DESCRIPTION OF THE DRAWINGS

The invention will now be further described with reference to the drawings, wherein FIG. 5 is a sectional view showing in an enlarged scale a bulge or dent with a gas flow opening in a bed plate according to the invention, FIGS. 6–8 illustrate various steps of a bulge forming method according to the invention.

DESCRIPTION OF THE PREFERRED EMBODIMENTS

Figure 1:
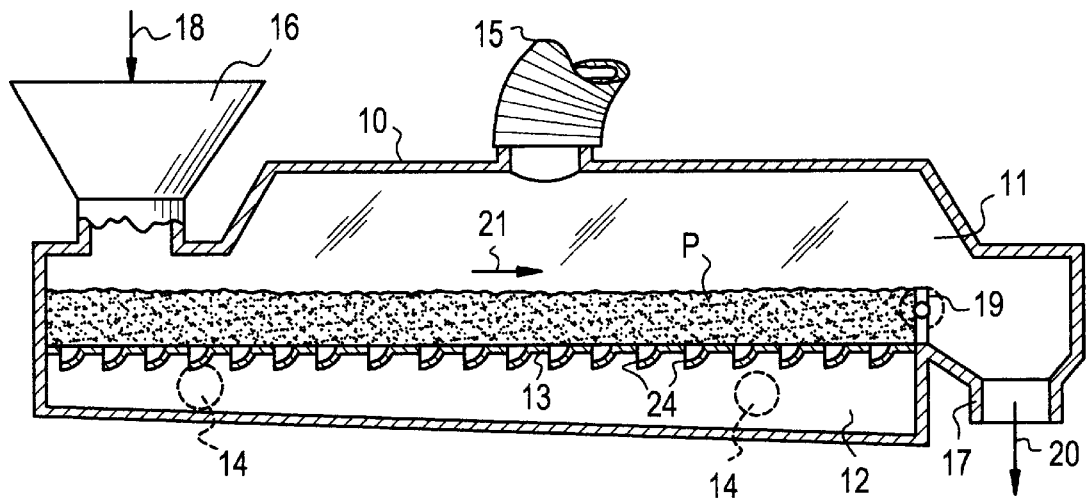
FIG. 1 is a side view and partially sectional view of a drying apparatus with a conventional fluid bed.

FIG. 1 shows a conventional fluid bed dryer which may, for example, be used for drying a partially dried and still moist powdered or particulate product, such as a pharmaceutical product, a milk product, or another food product. The moist product to be dried in the fluid bed dryer may, for example, have been produced by a spray drying process. The fluid bed dryer shown in FIG. 1 comprises an elongated housing 10 having an inner space divided into upper and lower chambers 11 and 12, respectively, by means of a perforated bed plate 13, which is fastened to the inner walls of the housing 10. Heated drying gas or air is supplied to the lower chamber or plenum chamber 12 of the housing 10 through gas inlets 14, and drying gas is exhausted from the upper chamber 11 of the housing through a gas exhaust conduit 15, which may, for example, be connected to a cyclone, hot shown, from which the drying gas may be exhausted into the atmosphere. At one end, the housing 10 comprises a product inlet funnel 16, which opens into the upper chamber 11 defined above the perforated bed plate 13. At the other end the housing 10 has a product outlet 17, which also communicates with the upper chamber 11. Alternatively, the fluid bed may be integrated in the lower part of a spray dryer.

A moist powdered or particulate product P, which may, for example, be supplied from a conventional spray drying system and which has to be further dried, may be fed continuously to the product inlet 16 of the housing 10 as indicated by an arrow 18. Heated drying gas or drying air is supplied to the lower chamber 12 of the housing, and the heated gas flows upwardly through the perforations of the bed plate and into the upper chamber 11 so as to form a plurality of gas flows fluidizing the product P on the bed plate 13. The thickness or the height of the fluidized product layer is determined by the height of a movable damper or valve member 19 forming an overflow at the outlet end of the chamber 11. When a state of equilibrium has been obtained an amount of dried product corresponding to the amount of moist product supplied through the inlet funnel 16 will flow out through the product outlet 17 as indicated by an arrow 20 in FIG. 1. Thus, when the fluid bed fryer is operating the fluidized product layer supported by the bed plate 13 is moved continuously from the inlet funnel 16 to the product outlet 17 as indicated by an arrow 21. When the operation of the fluid bed dryer has to be closed down, the supply of moist product to the inlet funnel 16 is stopped, and thereafter the damper or overflow plate 19 is moved to such a position that almost all of the product may flow from the bed plate 13 into the product outlet 17.

Figure 3:
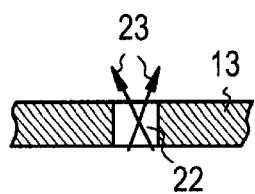
FIG. 3 is a sectional view illustrating part of a conventional bed plate with a punched cylindrical opening.

A fluid bed plate for use in a fluidizing apparatus as that shown in FIG. 1 may be a plane metal plate with a plurality of cylindrical openings or perforations 22 of the type shown in FIG. 1. Fluidizing gas from the plenum chamber 12 may then flow upwardly through the bed plate 13 in a substantially vertical direction as illustrated by arrows 23 in FIG. 3. A bed plate of this type has the disadvantage that the particulate product being fluidized may sift through the perforations 22 down into the plenum chamber 12 when supply of fluidizing gas to the plenum chamber 12 via the gas inlets 14 is stopped. Furthermore, when supply of particular product to the inlet funnel 16 has been stopped and the overflow plate 19 has been opened or removed a residual amount of product will remain on the bed plate 13, which means that the apparatus is not self-cleaning.

In order to ensure that no substantial residue of the product P remains on the bed plate when the damper 19 has been opened at least some of the perforations or gas distributing openings in the bed plate have to be formed so as to define upwardly directed fluidizing gas flows having a resulting horizontal flow component directed towards the product outlet 17.

Figure 2:
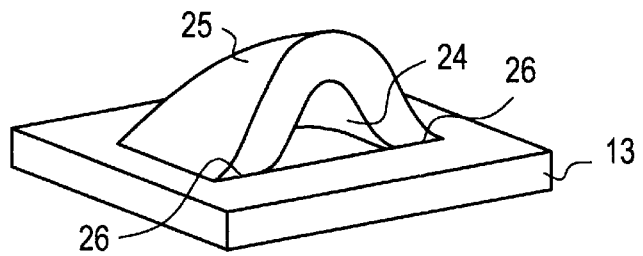
FIG. 2 is a perspective view illustrating a conventional gill-type opening in a bed plate.
Figure 4:
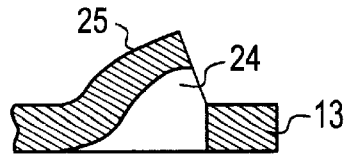
FIG. 4 is a sectional view of the gill-type opening shown in FIG. 2.

In conventional fluid bed plates this has been obtained by forming at least some of the openings in the bed plate as so-called gill-type openings 24. Such a gill-type opening is illustrated in FIGS. 2 and 4. A conventional opening of the gill-type is formed by cutting a rectilinear slit or slot in a plane plate metal blank and subsequently pressing an adjacent part of the blank into a bulge or dent 25 so as to form the gill-type opening 24. When the bulge or dent 25 is formed by deformation of the plate material a certain tearing of the plate material inevitably takes place in areas 26 at opposite ends of the slit or slot initially being cut. Therefore, the areas 26 of the gill-type opening define not only very narrow spaces or corners which are difficult to clean, but also tiny cracks or notches. Therefore a bed plate with gill-type openings are objectionable for use in connection with the treatment of i.a. pharmaceuticals and food products.

FIG. 5 is a sectional view of part of an embodiment of the fluid bed plate according to the invention. The bed plate 13 shown in FIG. 5 comprises a bulge or dent 27 having a wall part 28 which defines an acute angle of for example 75° with the adjacent part of the bed plate. A gas flow opening 29 is formed in the wall part 20 and may have a longitudinal axis 32 extending substantially at right angles to the wall part 28. As an example, the axis 32 of the gas flow opening 29 may define an angle of about 15° with the plane of the bed plate 13 as indicated in FIG. 5.

The bed plate shown in FIG. 5 may be made from plate metal, such as stainless steel, and each of the plurality of bulges 27 may be formed on the bed plate by pressing or drawing the plate material. Each gas flow opening 29 which may have any suitable cross-sectional shape, such as circular or elliptical, may be made in the plane plate metal blank prior to forming the associated bulge or dent 27, or the gas flow opening 29 may be formed in the wall part 28 after forming the bulge or dent. The gas flow opening 29 which is defined by an edge portion without any cracks or notches may be formed by punching, laser-cutting or any kind of machining, such as drilling or milling or another kind of cutting operation by which plate material is being cut away.

A fluid bed plate 13 having a plurality of bulges or dents 27 as that shown in FIG. 5 may be used in connection with a fluid bed apparatus as that shown in FIG. 1. The fluidizing air flows passing through the flow openings 29 will be directed downwardly against the plane of the plate. Therefore, the bed plate will be of the non-sifting, self-cleaning type. Furthermore, because each of the gas flow openings 29 may be made with any desired cross-sectional shape without narrow corners, cracks or notches so that the bed plate may be efficiently cleaned, the risk of bacterial contamination may be minimized.

FIGS. 6–8 illustrate a method of forming a bulge or dent 27 forming part of a bed plate 13 according to the invention. FIGS. 6a and 6b illustrate part of a plane plate metal blank 30 in side view and plan view, respectively. An oblong opening 31 being defined by a pair of parallel, mutually spaced side portions and concavely curved end portions has been formed in the plate blank 30, for example by punching. Thereafter, a preliminary bulge 27' is formed in the plate blank 30 in such a position that the opening 31 is positioned inside and adjacent to the circumference of the preliminary bulge 27'. As a last step the preliminary bulge 27' is exposed to a pressure so as to form the preliminary bulge into a shape as shown in FIGS. 8a and 8b. As shown, the axis 32 of a gas flow through the opening 31 is directed towards the plane of the bed plate. Thereby sifting of material through the openings 31 of the bed plate may be prevented when supply of fluidizing gas through these openings has been stopped.

Figure 9:
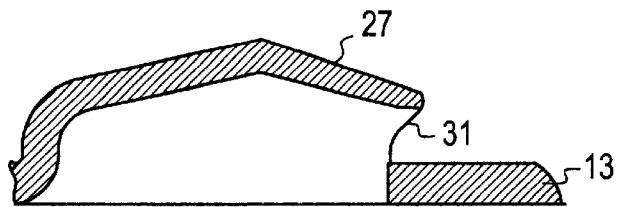
FIGS. 9–11 are sectional view of different embodiments of bulges or dents which may be formed in a bed plate according to the invention.
Figure 10:
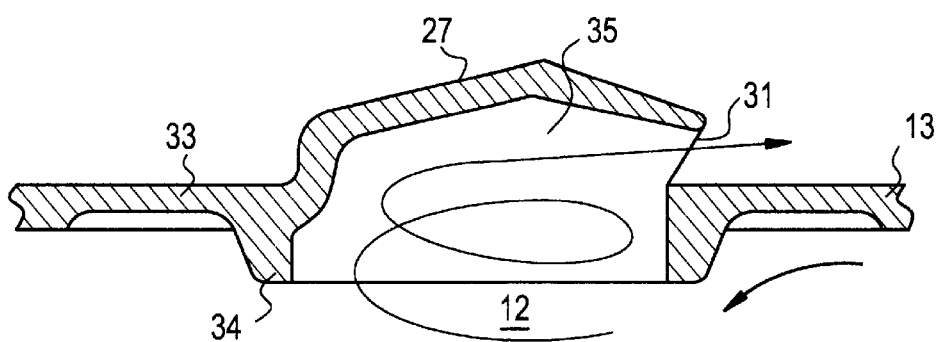

FIGS. 9 and 10 illustrate modified embodiments of the bulge or dent shown in FIG. 8. These bulges may be made in a similar manner as described in connection with FIGS. 6–8. In FIGS. 8, 9 and 10 the rim portions defining the gas flow openings 31 form acute angles with the plane of the adjacent part of the bed plate 13. Furthermore, in the embodiment shown in FIG. 10 the plate material in an annular area 33 surrounding the bulge or dent 27 has been compressed whereby some of the plate material has been displaced to form an annular, downwardly extending flange or collar portion 34. The collar portion 34 increases the space 35 defined inside the bulge 27. This means that the air flow from the plenum chamber 12, via the inner space volume 35 of the bulge 27 and out through the opening 31 becomes less influenced by possible turbulent air flows within the plenum chamber 12.

Figure 11:
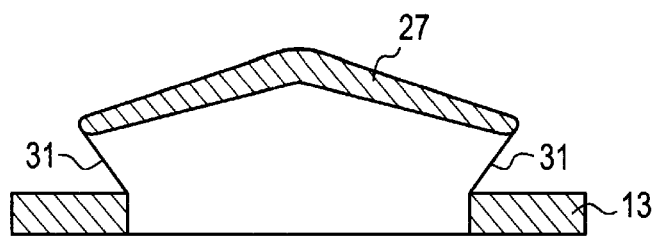

FIG. 11 illustrates a bulge 27 of a similar type as shown in FIGS. 9 and 10. However, the bulge 27 shown in FIG. 11 is provided with a pair of oppositely directed air flow openings 31, each of which is defined by an edge portion forming an acute angle with the pane of the adjacent part of the bed plate 13. Each of the openings 31 may be formed by punching or cutting a pair of openings in a plate metal blank 30 and subsequently forming the bulge 27 in a similar manner as illustrated in FIGS. 6–8. Alternatively, however, the openings 31 in FIG. 11 may be cut or formed after forming the bulge 27.

The bed plates according to the invention may have bulges or dents of one and the same type, only, and the gas flow openings defined in the bulges may be directed in the same direction, or the plate may have bulges with oppositely directed gas flow openings, or gas flow openings which are directed such that the gas flows therethrough mutually defined acute angles, right angles, and/or obtuse angles. Furthermore, one and the same bed plate 13 may comprise bulges or dents 27 of different types. The bulges or dents may be uniformly distributed on the bed plate, or the mutual spacing of the bulges may change along the bed plate.

Figure 12:
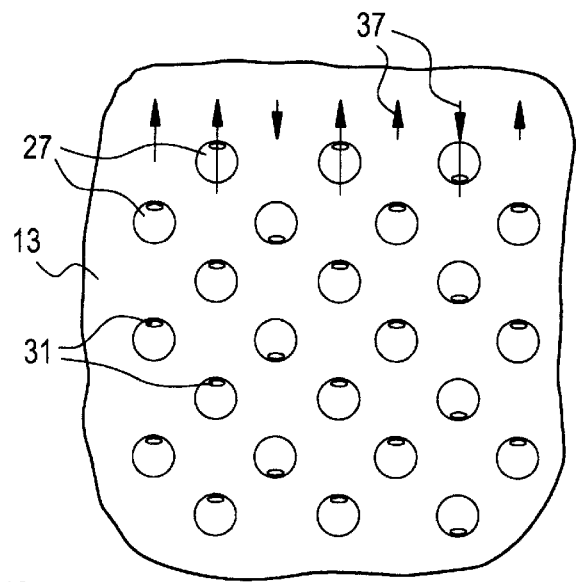
FIGS. 12–14 illustrate various patterns of bulges or dents in fluid bed plates according to the invention.

FIG. 12 is a plan view of a bed plate section comprising a plurality of bulges or dents 27 which may, for example be any of the types shown in FIGS. 5, 9 and 10. The bulges 27 are uniformly distributed on the bed plate and arranged in rows extending parallel to the longitudinal axis of the bed plate.

As indicated by arrows 37 a majority of the bulges 27 have their gas flow openings directed towards the product outlet 17 while a minority of bulges have their gas flow openings directed in the opposite direction towards the product inlet 16.

Figure 13:
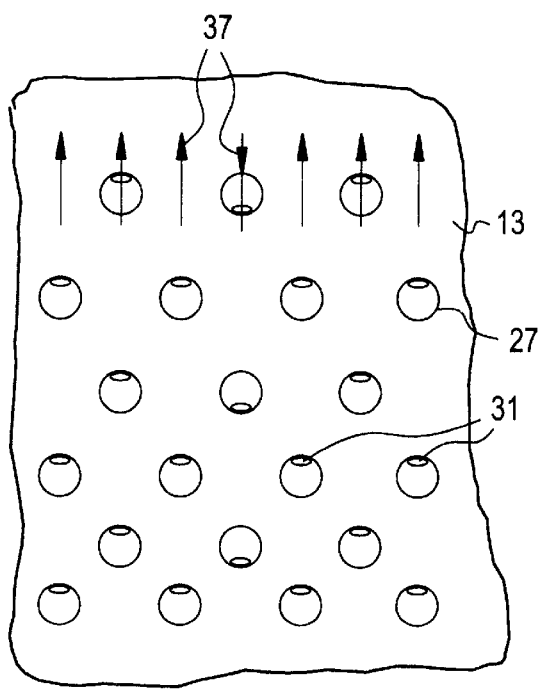

In the bed plate 13 illustrated in FIG. 13 the gas flow openings 31 are also oppositely directed so that the majority of bulges 27 have their gas flow openings 31 directed towards the product outlet 17 while a minority of openings 31 are directed oppositely. The bulges 27 are not only arranged in longitudinally extending rows, but also in transversely extending rows. The mutual distance between the transversely extending rows of bulges 27 increases in the direction towards the product outlet. The pattern of bulges illustrated in FIG. 13 takes into account that when the product is moving from the product inlet 16 to the product outlet 17 the moisture content of the product is gradually being decreased so that the product needs less fluidizing gas to become fluidized.

Figure 14:
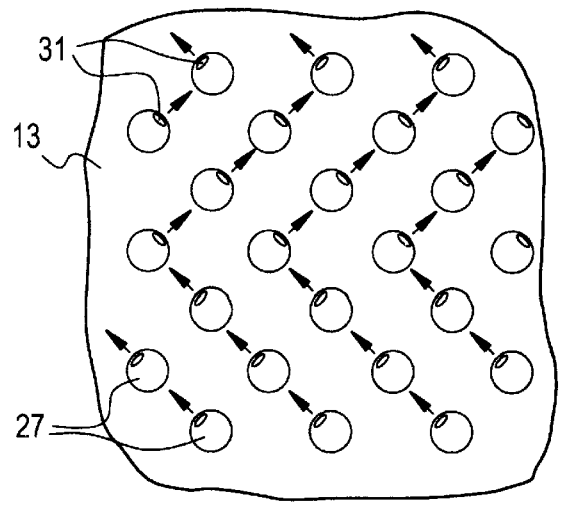

FIG. 14 illustrates a bed plate with uniformly distributed bulges or dents 27. The bulges or dents are arranged in sets of rows extending at right angles in relation to each other, namely, longitudinally as well as in transversely extending rows. The gas flow openings 31 are oriented such that the gas flow through each opening 31 defines an angle of about 45° with a longitudinal direction of the bed plate. The gas flow openings 31 are uniformly oriented in each transversely extending row. However, the orientation of the gas flow openings 31 in adjacent transversely extending rows may define an angle of about 90°.

It should be understood that various changes and modifications of the embodiments described above could be made within the scope of the present invention. Thus, the bulges or dents 27 may be shaped in any suitable manner provided that at least one gas flow opening is formed therein in such a manner that it is defined by an edge portion or rim portion without cracks, notches and small acute vertices.

EXAMPLE

A bed plate for a fluid bed apparatus is made from 2 mm thick sheet or plate of stainless steel. A great plurality of bulges or dents each having a gas flow openings are formed in the sheet or plate by the method illustrated in FIGS. 6–8. The bulges or dents are forming a square pattern as that illustrated in FIG. 12. The mutual distance between the centres of the bulges or dents (the length of the sides of the squares in the square pattern) is 25 mm so that the number of bulges or dents is 1600 per $m^2$ of the plate and the area of each gas flow opening is about 7 $mm^2$. The inner volume defined by each bulge or dent is about 660 $mm^3$, which is about 20 times the inner volume defined by each gill of a typical conventional bed plate of the gill type. The relatively large volume of the space defined within the bulges or dents of the bed plate according to the invention reduces the influence of gas flows within the plenum chamber on the gas flow passing through the openings of the bulges.

What is claimed is:

1. A bed plate for a fluid bed apparatus, said bed plate comprising a plurality of bulges or dents each having at least one through-going gas flow opening defined therein by a surrounding edge portion in a manner so as to exclude the formation of notches in said edge portion, the maximum dimension of each of the bulges or dents being only a small fraction of the minimum dimension of the bed plate, each of at least a substantial part of the gas flow openings being directed in relation to the plane of the bed plate so as to cause a flow of gas being passed through the opening to contact an adjacent part of the bed plate interconnecting said bulges or dents.

2. A bed plate according to claim 1, wherein the axis of said at least one gas flow opening and the plane of the bed plate are diverging and defining between them an angle being smaller than 20°.

3. A bed plate according to claim 2, wherein the angle defined between the axis of the gas flow opening and the plane of the bed plate is smaller than 15°.

4. A bed plate according to claim 3, wherein said angle is smaller than 12.5°.

5. A bed plate according to claim 1, wherein the axis of said at least one gas flow opening and the plane of the bed plate are converging.

6. A bed plate according to claim 5, wherein the axis of said at least one gas flow opening and the plane of the bed plate define between them an angle being less than 45°.

7. A bed plate according to claim 1, wherein each of at least some of said bulges or dents comprises a substantially plane wall part in which the gas flow opening is formed.

8. A bed plate according to claim 1, wherein the edge portion of each gas flow opening has a curved shape along its total extent.

9. A bed plate according to claim 8, wherein the edge portion of each gas flow opening has a radius of curvature being at least 0.2 mm.

10. A bed plate according to claim 9, wherein the radius of curvature is at least 1.0 mm.

11. A bed plate according to claim 1, made from a metallic material.

12. A bed plate according to claim 11, wherein the metallic material is stainless steel.

13. A bed plate according to claim 1, wherein the inner space defined by each bulge or dent is surrounded by a collar or rim portion extending from the plate opposite to the bulges or dents.

14. A bed plate according to claim 1, wherein at least some of the bulges or dents are shaped substantially as spherical segments.

15. A bed plate according to claim 1, wherein said at least one gas flow opening has an elongated shape with a major axis extending substantially parallel with the plane of the bed plate.

16. A bed plate according to claim 1 comprising 1000–10000 bulges or dents per square meter.

17. A bed plate according to claim 16 comprising 1500–3000 bulges or dents per square meter.

18. A bed plate according to claim 17, wherein the plate blank has a thickness of about 2 mm.

19. A method of making a bed plate for a fluid bed apparatus from a plate blank, said method comprising forming a plurality of bulges or dents each having at least one through-going gas flow opening defined therein by a surrounding edge portion in the plate blank in a manner so as to exclude the formation of notches in said edge portion, the maximum dimension of each of the bulges or dents being only a small fraction of the minimum dimension of the bed plate, each of at least a substantial part of the gas flow openings being directed in relation to the plane of the bed plate so as to cause a flow of gas being passed through the opening to contact an adjacent part of the bed plate interconnecting said bulges or dents.

20. A method according to claim 19, wherein said at least one gas flow opening is formed such that its axis and the plane of the bed plate are diverging and defining between then an angle being smaller than 20°.

21. A method according to claim 20, wherein the angle defined between the axis of the gas flow opening and the plane of the bed plate is smaller than 15°.

22. A method according to claim 19, wherein said at least one gas flow opening is formed such that the axis of the gas flow opening and the plane of the bed plate are converging.

23. A method according to claim 22, wherein the axis of said at least one gas flow opening and the plane of the bed plate define between them an angle being less than 45°.

24. A method according to claim 19, wherein each of at least some of said bulges or dents are shaped so as to comprise a substantially plane wall part in which the gas flow opening is formed.

25. A method according to claim 19, wherein a curved shape is applied to the edge portion of each gas flow opening along its total extent.

26. A method according to claim 19, wherein the edge portion of each gas flow opening is formed with curved parts each having a radius of curvature being at least 0.2 mm.

27. A method according to claim 19, wherein each through-going gas flow opening is made by cutting plate material out from the plate blank.

28. A method according to claim 19, wherein said at least one gas flow opening is formed with an elongated shape having a major axis extending substantially parallel with the plane of the bed plate.

29. A method according to claim 28, wherein the gas flow openings are cut in the plate blank by punching.

30. A method according to claim 28, wherein the gas flow openings are cut in the plate blank by means of laser.

31. A method according to claim 28, wherein each of at least some of said plurality of gas flow openings are cut in a plate blank part prior to forming said plate blank part into a bulge or dent.

32. A method according to claim 28, wherein the gas flow openings are cut in at least some of the bulges or dents after formation of the same.

33. A method according to claim 19, wherein the bulges or dents are formed by plastic deformation of the plate blank material.

34. A method according to claim 19, wherein the edge portions of the gas flow openings are shaped by plastic deformation of the plate blank material surrounding each opening.

35. A method according to claim 19, wherein each bulge or dent is formed in at least two steps, said plate blank part with the gas flow opening or openings cut therein being included into the bulge or dent during a step later than the first step.

36. A method according to claim 19, wherein each bulge or dent is formed in at least two steps, said plate blank part with the gas flow opening or openings cut therein being included into the bulge or dent during the first step.

37. A fluid bed apparatus comprising a fluidizing chamber having a product inlet and a product outlet, a bed plate defining the fluidizing chamber downwardly, and a plenum chamber defined below the bed plate for the supply of fluidizing gas, the bed plate comprising a plurality of bulges or dents each having at least one through-going gas flow opening defined therein by a surrounding edge portion in a manner so as to exclude the formation of notches in said edge portion, the maximum dimension of each of the bulges or dents being only a small fraction of the minimum dimension of the bed plate, each of at least a substantial part of the gas flow openings being directed in relation to the plane of the bed plate so as to cause a flow of gas being passed through the opening to contact an adjacent part of the bed plate interconnecting said bulges or dents.

38. A fluid bed apparatus according to claim 37, wherein the bulges or dents are positioned at the upper side of the bed plate.

39. A fluid bed apparatus according to claim 37, wherein the volume of the inner space defined within each bulge or dent is sufficient to substantially reduce the influence of turbulence in the plenum chamber on the direction and magnitude of the flow of gas through the gas flow opening or openings in the bulge or dent.

* * * * *